United States Patent
Manning et al.

(10) Patent No.: US 12,143,378 B2
(45) Date of Patent: Nov. 12, 2024

(54) MULTIMEDIA MESSAGE (MMS) OBJECT SEQUENCES AS MULTI-FACTOR AUTHENTICATION (MFA) FOR USER IDENTIFICATION IN 5G

(71) Applicant: T-Mobile Innovations LLC, Overland Park, KS (US)

(72) Inventors: Serge Mukerji Manning, Plano, TX (US); Gregory Schumacher, Holliston, TX (US); Marouane Balmakhtar, Fairfax, VA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 239 days.

(21) Appl. No.: 17/824,416

(22) Filed: May 25, 2022

(65) Prior Publication Data

US 2023/0388297 A1    Nov. 30, 2023

(51) Int. Cl.
*G06F 21/00* (2013.01)
*H04L 9/40* (2022.01)

(52) U.S. Cl.
CPC .......... *H04L 63/0853* (2013.01); *H04L 63/18* (2013.01)

(58) Field of Classification Search
CPC ................. H04L 63/0853; H04L 63/18; H04L 2463/082
See application file for complete search history.

(56) References Cited

U.S. PATENT DOCUMENTS

| | | | |
|---|---|---|---|
| 9,235,715 B1* | 1/2016 | Bailey | G06F 21/602 |
| 9,344,615 B1* | 5/2016 | Bostick | H04N 23/62 |
| 10,764,301 B2* | 9/2020 | Chen | G06F 21/31 |
| 11,539,711 B1* | 12/2022 | Miller | H04L 63/1483 |
| 2017/0142126 A1* | 5/2017 | Chen | G06F 21/36 |
| 2019/0182050 A1* | 6/2019 | Famechon | G06F 21/36 |
| 2019/0228140 A1* | 7/2019 | Arroyo | G06V 40/1365 |
| 2020/0177643 A1* | 6/2020 | Bhushan | H04L 67/141 |
| 2022/0191016 A1* | 6/2022 | Brown | H04L 63/107 |
| 2022/0414978 A1* | 12/2022 | Goodsitt | G06T 17/00 |
| 2023/0119262 A1* | 4/2023 | Barnett | G06T 1/0085 382/100 |

\* cited by examiner

*Primary Examiner* — Kendall Dolly
(74) *Attorney, Agent, or Firm* — Shook, Hardy & Bacon L.L.P.; Elena K. McFarland

(57) ABSTRACT

Systems and methods for providing multi-factor authentication based on visual objects associated with an out of band shared secret delivery channel and at least one user device of a telecommunication network include an access point communicatively coupled to an authentication system. The authentication system is structured to generate a set of visual objects, cause the set of visual objects to be output by a first user device, transmit, via an out of band shared secret delivery channel, a visual object request to cause a secondary user device to output one or more out of band visual objects, receive an indication of object selection from the set of visual objects, determine that the indication of the object selection is associated with a visual selection match among the set of visual objects, and based on the visual selection match, authenticate access to an application associated with the authentication system.

20 Claims, 4 Drawing Sheets

MULTIMEDIA MESSAGE (MMS) OBJECT SEQUENCES AS MULTI-FACTOR AUTHENTICATION (MFA) FOR USER IDENTIFICATION IN 5G

SUMMARY

The present disclosure is directed, in part, to providing multi-factor authentication based on visual objects associated with an out of band shared secret delivery channel and at least one user device of a telecommunications network, substantially as shown in and/or described in connection with at least one of the figures, and as set forth more completely in the claims.

In aspects set forth herein, a user device is connected to a telecommunication network. Typically, multi-factor authentication (MFA) uses short message service (SMS) sent to the user device. The SMS delivers a numeric code that is entered into an application. Sometimes a CAPTCHA (Completely Automated Public Turing test to tell Computers and Humans Apart) challenge-response mechanism is used to verify that access to the application is not due to an automaton attack (e.g., fraud and cyber-attacks). However, here, an authentication system associated with a first user device causes a set of visual objects to be output by the first user device, transmits, via an out of band shared secret delivery channel, a visual object request to cause a secondary user device to output one or more out of band visual objects, and based on a visual selection match, authenticates access to an application associated with the authentication system and the first user device which increases the difficulty to achieve automation-based MFA interception attacks.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

Figure 1:
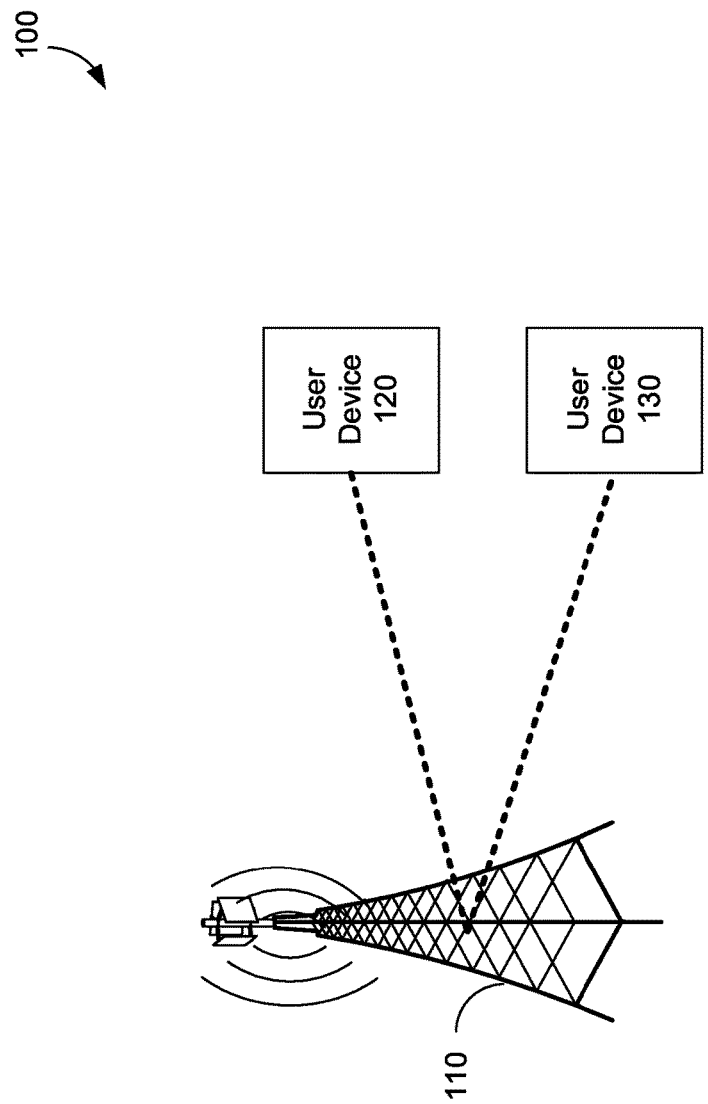
FIG. 1 depicts an example of a network environment in accordance with one or more embodiments.

The subject matter of embodiments of the invention is described with specificity herein to meet statutory requirements. However, the description itself is not intended to limit the scope of this patent. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

In certain aspects, methods are provided for multi-factor authentication based on visual objects associated with an out of band shared secret delivery channel and at least one user device of a telecommunications network (e.g., a telecom network). A set of visual objects is generated. The set of visual objects are caused to be output by the first user device. A visual object request to cause a secondary user device to output one or more out of band visual objects corresponding to the set of visual objects associated with an out of band shared secret delivery channel is transmitted based on the set of visual objects. An indication of object selection from the set of visual objects is received, by the first user device, based on the one or more out of band visual objects. The indication of the object selection is associated with a visual selection match among the set of visual objects is determined. Access to an application associated with the authentication system and the first user device is authenticated based on the visual selection match.

Advantageously, providing multi-factor authentication based on visual objects associated with an out of band shared secret delivery channel and at least one user device of a telecommunications network increases the security and difficulty to achieve automation-based MFA interception attacks.

In one aspect, a method is provided for multi-factor authentication based on visual objects associated with an out of band shared secret delivery channel and at least one user device of a telecommunications network. The method includes generating, by an authentication system associated with a first user device, a set of visual objects. The method also includes causing the set of visual objects to be output by the first user device. The method further includes, based on the set of visual objects, transmitting, via an out of band shared secret delivery channel, a visual object request to cause a secondary user device to output one or more out of band visual objects corresponding to the set of visual objects associated with an out of band shared secret delivery channel. The method further includes, based on the one or more out of band visual objects, receiving, by the first user device, an indication of object selection from the set of visual objects. The method further includes determining that the indication of the object selection is associated with a visual selection match among the set of visual objects. The method further includes, based on the visual selection match, authenticating access to an application associated with the authentication system and the first user device.

In another aspect, a computer-readable storage media having computer-executable instructions embodied thereon is provided that, when executed by one or more processors, cause the processors to perform various steps. The processors are caused to generate, by an authentication system associated with a first user device, a set of visual objects. The processors are also caused to cause the set of visual objects to be output by the first user device. The processors are further caused to, based on the set of visual objects, transmit, via an out of band shared secret delivery channel, a visual object request to cause a secondary user device to output one or more out of band visual objects corresponding to the set of visual objects associated with an out of band shared secret delivery channel, the one or more out of band visual objects including a string. The processors are further caused to, based on the one or more out of band visual objects, receive, by the first user device, an indication of object selection from the set of visual objects. The processors are further caused to determine that the indication of the object selection is associated with a visual selection match among the set of visual objects. The processors are further caused to, based on the visual selection match, authenticate access to an application associated with the authentication system and the first user device.

In yet another aspect, a system is provided for multi-factor authentication based on visual objects associated with an out of band shared secret delivery channel and at least one user device of a telecommunication network. The system includes an access point communicatively coupled to an authentication system. The authentication system generates, by an authentication system associated with a first user device, a set of visual objects. The authentication system also causes the set of visual objects to be output by the first user device. The authentication system further, based on the set of visual objects, transmits, via an out of band shared secret delivery channel, a visual object request to cause a secondary user device to output one or more out of band visual objects corresponding to the set of visual objects associated with an out of band shared secret delivery channel. The authentication system further, based on the one or more out of band visual objects, receives, by the first user device, an indication of object selection from the set of visual objects. The authentication system further determines that the indication of the object selection is associated with a visual selection match among the set of visual objects. The authentication system further, based on the visual selection match, authenticates access to an application associated with the authentication system and the first user device.

Throughout this disclosure, several acronyms and shorthand notations are used to aid the understanding of certain concepts pertaining to the associated system and methods. These acronyms and shorthand notations are intended to help provide an easy methodology of communicating the ideas expressed herein and are not meant to limit the scope of aspects herein.

Embodiments herein may be embodied as, among other things: a method, system, or set of instructions embodied on one or more computer-readable media. Computer-readable media include both volatile and nonvolatile media, removable and nonremovable media, and contemplate media readable by a database, a switch, and various other network devices. Computer-readable media includes media implemented in any way for storing information. Examples of stored information include computer-useable instructions, data structures, program circuitry, and other data representations. Media examples include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently. Embodiments may take the form of a hardware embodiment, or an embodiment combining software and hardware. Some embodiments may take the form of a computer-program product that includes computer-useable or computer-executable instructions embodied on one or more computer-readable media.

"Computer-readable media" may be any available media and may include volatile and nonvolatile media, as well as removable and non-removable media. By way of example, and not limitation, computer-readable media may include computer storage media and communication media.

"Computer storage media" may include, without limitation, volatile and nonvolatile media, as well as removable and non-removable media, implemented in any method or technology for storage of information, such as computer-readable instructions, data structures, program circuitry, or other data. In this regard, computer storage media may include, but is not limited to, Random Access Memory (RAM), Read-Only Memory (ROM), Electrically Erasable Programmable Read-Only Memory (EEPROM), flash memory or other memory technology, CD-ROM, digital versatile disks (DVDs) or other optical disk storage, magnetic cassettes, magnetic tape, magnetic disk storage, or other magnetic storage devices, or any other medium which may be used to store the desired information and which may be accessed by the computing device 500 shown in FIG. 5. Computer storage media does not comprise a signal per se.

"Communication media" may include, without limitation, computer-readable instructions, data structures, program circuitry, or other data in a modulated data signal, such as a carrier wave or other transport mechanism, and may include any information delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above also may be included within the scope of computer-readable media.

A "network" refers to a network comprised of wireless and wired components that provide wireless communications service coverage to one or more UE. The network may comprise one or more base stations, one or more cell sites (i.e., managed by a base station), one or more cell towers (i.e., having an antenna) associated with each base station or cell site, a gateway, a backhaul server that connects two or more base stations, a database, a power supply, sensors, and other components not discussed herein, in various embodiments.

The terms "base station" and "cell site" may be used interchangeably herein to refer to a defined wireless communications coverage area (i.e., a geographic area) serviced by a base station. It will be understood that one base station may control one cell site or alternatively, one base station may control multiple cell sites. As discussed herein, a base station is deployed in the network to control and facilitate, via one or more antenna arrays, the broadcast, transmission, synchronization, and receipt of one or more wireless signals in order to communicate with, verify, authenticate, and provide wireless communications service coverage to one or more UE that request to join and/or are connected to a network.

An "access point" may refer to hardware, software, devices, or other components communicatively coupled to a computing device and/or at a base station, cell site, and/or cell tower having an antenna, an antenna array, a radio, a transceiver, and/or a controller. Generally, an access point (e.g., the access point 220 illustrated in FIG. 2) may communicate directly with user equipment according to one or more access technologies (e.g., 3G, 4G, 5G, mMIMO, Wi-Fi, etc.) as discussed hereinafter.

The terms "user equipment," "UE," and "user device" are used interchangeably to refer to a device employed by an end-user that communicates using a network. UE generally includes one or more antenna coupled to a radio for exchanging (e.g., transmitting and receiving) transmissions with a nearby base station, via an antenna array of the base station. In embodiments, the UE may take on any variety of devices, such as a personal computer, a laptop computer, a tablet, a netbook, a mobile phone, a smart phone, a personal digital assistant, a wearable device, a fitness tracker, or any other device capable of communicating using one or more resources of the network. The UE may include components such as software and hardware, a processor, a memory, a display component, a power supply or power source, a speaker, a touch-input component, a keyboard, and the like. In embodiments, some of the UE discussed herein may include current UE capable of using 5G and having backward compatibility with prior access technologies, current UE capable of using 5G and lacking backward compatibility with prior access technologies, and legacy UE that is not capable of using 5G.

The terms "radio," "controller," "antenna," and "antenna array" are used interchangeably to refer to one or more software and hardware components that facilitate sending and receiving wireless radio-frequency signals, for example, based on instructions from a base station. A radio may be used to initiate and generate information that is then sent out through the antenna array, for example, where the radio and antenna array may be connected by one or more physical paths. Generally an antenna array comprises a plurality of individual antenna elements. The antennas discussed herein may be dipole antennas, having a length, for example, of ¼, ½, 1, or 1½ wavelength. The antennas may be monopole, loop, parabolic, traveling-wave, aperture, yagi-uda, conical spiral, helical, conical, radomes, horn, and/or apertures, or any combination thereof. The antennas may be capable of sending and receiving transmission via FD-MIMO, Massive MIMO, 3G, 4G, 5G, and/or 802.11 protocols and techniques.

Additionally, it will be understood that terms such as "first," "second," and "third" are used herein for the purposes of clarity in distinguishing between elements or features, but the terms are not used herein to import, imply, or otherwise limit the relevance, importance, quantity, technological functions, sequence, order, and/or operations of any element or feature unless specifically and explicitly stated as such.

FIG. 1 illustrates an example of a network environment 100 suitable for use in implementing embodiments of the present disclosure. The network environment 100 is but one example of a suitable network environment and is not intended to suggest any limitation as to the scope of use or functionality of the disclosure. Neither should the network environment 100 be interpreted as having any dependency or requirement relating to any one or combination of components illustrated.

The network environment 100 provides service to one or more user devices 120 and 130. In some embodiments, the network environment 100 may include a telecom network 110 (e.g., a telecommunication network such as, but not limited to, a wireless telecommunication network), or portion thereof. The network environment 100 may include one or more devices and components, such as base stations, servers, switches, relays, amplifiers, databases, nodes, etc. which are not shown so as not to confuse other aspects of the present disclosure. Those devices and components may provide connectivity in a variety of implementations. In addition, the network environment 100 may be utilized in a variety of manners, such as a single network, multiple networks, or as a network of networks, but, ultimately, is shown as simplified as possible to avoid the risk of confusing other aspects of the present disclosure.

The telecom network 110 included in the network environment 100 may include or otherwise may be accessible through a cell site. The cell site may include one or more antennas, base transmitter stations, radios, transmitter/receivers, digital signal processors, control electronics, GPS equipment, power cabinets or power supply, base stations, charging stations, etc. such that the cell site may provide a communication link between the one or more user devices (e.g., the user devices 120 and 130) and other components, systems, equipment, and/or devices of the network environment 100. The base station and/or a computing device (e.g., whether local or remote) associated with the base station may manage or otherwise control the operations of components of the cell site.

In some embodiments, the cell site may be operable in a non-stand alone mode. In the non-stand alone (NSA) mode the network environment 100 may take the form of, for example, an E-UTRAN New Radio-Dual Connectivity (EN-DC) network. In an EN-DC network, a user device (e.g., the user devices 120 and/or 130) may connect to or otherwise access a 4G, LTE, 5G, or any other suitable network simultaneously. In the stand alone mode, the telecom network 110 may take the form of a 5G network or any other suitable network.

In some embodiments, the user device (e.g., the user devices 120 and/or 130) may take the form of a wireless or mobile device capable of communication via the network environment 100. For example, the user device 120 may take the form of a mobile device capable of communication via a telecom network (e.g., the telecom network 110) such as, but not limited to, a wireless telecommunication network. In this regard, the user device may be any mobile computing device that communicates by way of a network, for example, a 4G, LTE, 5G, 6G, or any other type of network.

In some embodiments, the network environment 100 may connect subscribers (e.g., current subscribers and/or potential subscribers) to a service provider or a plurality of service providers. Alternatively or additionally, the network environment 100 may be associated with a specific telecommunication provider or a plurality of telecommunications providers that provide services (e.g. 5G, voice, location, data, etc.) to one or more user devices. For example, the user devices 120 and 130 may be subscribers to a telecommunication service provider, in which the user devices are registered or subscribed to receive voice and data services (e.g., receive content that may be streamed, downloaded, etc.) over the network environment 100. The network environment 100 may include any communication network providing voice and/or data service(s), such as, for example, a 4G network (LTE, WiMAX, HSDPA), 5G network, or 6G network.

Having described the network environment 100 and components operating therein, it will be understood by those of ordinary skill in the art that the network environment 100 is but one example of a suitable network and is not intended to limit the scope of use or functionality of aspects described herein. Similarly, the network environment 100 should not be interpreted as imputing any dependency and/or any requirements with regard to each component and combination(s) of components illustrated in FIG. 1. It will be appreciated by those of ordinary skill in the art that the number, interactions, and physical location of components illustrated in FIG. 1 are examples, as other methods, hardware, software, components, and devices for establishing one or more communication links between the various components may be utilized in implementations of the present invention. It will be understood to those of ordinary skill in the art that the components may be connected in various manners, hardwired or wireless, and may use intermediary components that have been omitted or not included in FIG. 1 for simplicity's sake. As such, the absence of components from FIG. 1 should not be interpreted as limiting the present invention to exclude additional components and combination(s) of components. Moreover, though components may be represented as singular component or may be represented in a particular quantity in FIG. 1, it will be appreciated that some aspects may include a plurality of devices and/or components such that FIG. 1 should not be considered as limiting the quantity of any device and/or component.

Figure 2:
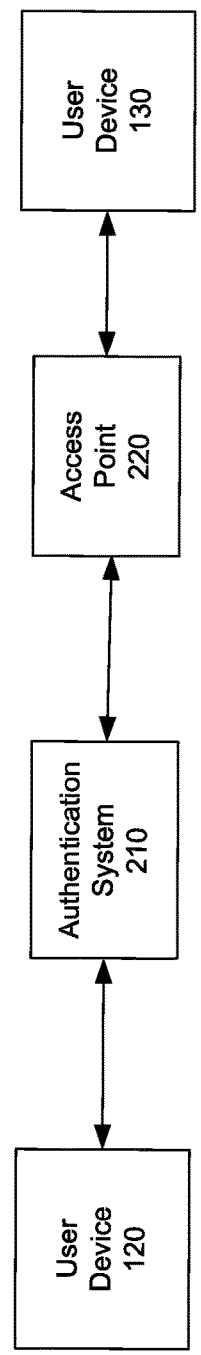
FIG. 2 is a diagram of a network environment including an authentication system in accordance with an example embodiment.

FIG. 2 is a diagram of the network environment 200 (e.g., a telecommunication environment such as, but not limited to, a wireless telecommunication environment) according to an example embodiment. In the present embodiment, the network environment 200 includes the telecom network 110, authentication system 210, access point 220, and one or more user devices 120 and 130. Although some of the components in the network environment 200 are depicted as multiple components (e.g., multiple user devices), in some embodiments, the network environment 200 may include one of such components.

In some embodiments, the network environment 100 may include an authentication system (e.g., the authentication system 210). The authentication system may permit access to a web service, application, web browser, and/or any other suitable system that requires identity verification. The authentication system may be associated with the first user device (e.g., the user device 120). The authentication system may generate a set of visual objects. As referenced herein, the term "set of visual objects" may be used to refer to or may otherwise include at least one of a text phrase, a set of images, a single image, etc. In some embodiments, the text phrase may include at least one multiple choice question. The at least one multiple choice question may have a single select or multi-select answer option(s). The authentication system 210 may be included within the user devices 120 and/or 130, external to the user devices 120 and/or 130, or otherwise communicatively coupled to the user devices 120 and/or 130.

In some examples, the authentication system 210 may cause the set of visual objects to be output by the user device. The set of visual objects may be caused to be output by the authentication system associated with the first user device. For example, the authentication system 210 may cause the user device 120 to display a set of images. In some embodiments, the first user device may output one or more text phrases. For example, the authentication system 210 may cause the first user device 120 to display one or more multiple choice questions as the text phrase(s). Alternatively or additionally, the authentication system associated with the user device (e.g., the first user device) may cause output of a set of visual objects that correspond to an event over time.

In some embodiments, based on the set of visual objects, the authentication system 210 may transmit, by the first user device, a visual object request. The visual object request may be transmitted to cause a secondary user device to output one or more out of band visual objects corresponding to the set of visual objects associated with an out of band shared secret delivery channel. The one or more out of band visual objects may include one or more images associated with or otherwise including a change of at least one of a resolution, rotation, background color, or distortion. A multimedia message (MMS), in some examples, may include the one or more out of band visual objects such that the one or more out of band visual objects may be transmitted or otherwise sent via one or more multimedia messages. For example, the authentication system 210 may transmit the visual object request to cause the secondary user device 130 to output or otherwise display an out of band visual object (e.g., an out of band image) that has been modified by changing the resolution and/or the background color gradients, rotating the visual object, warping the visual object, etc. when compared to one of the visual objects (e.g., images) displayed on the first user device 120. In some examples, the one or more out of band visual objects may include a type of visual object. In such examples, the secondary user device 130 may output (e.g., display) an out of band visual object (e.g., an out of band image) that defines the type of image. The type of image may include an image of traffic lights, trees, vehicles, animals, chairs, or any other suitable image and/or image type.

Alternatively or additionally, the one or more out of band visual objects may correspond to an event over time. The event over time may correspond to one or more next events (e.g., an event that logically follows a current event). In this regard, the secondary user device 130 may output (e.g., display) a sequence of images and/or a video, or a portion thereof (e.g., a frame of a video), that indicate that an event is happening over time. For example, the one or more out of band visual objects (e.g., the image sequence(s)) may include opening and walking out a door, walking in and closing a door, opening and closing a box, or any other suitable sequence of visual objects that correspond to a next event.

In some embodiments, the one or more out of band visual objects may include a string. In such embodiments wherein the one or more out of band visual objects(s) include the string, the one or more out of band visual objects may be associated with the out of band shared secret delivery channel. As used herein, the term "string" may be used to refer to a sequence of one or more alphanumeric characters or tokens. The string may be embedded within each visual object (e.g., within each image) and delivered to the secondary user device 130 based on steganography. The string may be extracted by an application associated with the secondary user device 130. In this regard, the secondary user device 130 may extract the string (e.g., the embedded string) and output or otherwise display the string. The first user device may receive the string as input by the user.

In some examples, the authentication system 210 may, based on the one or more out of band visual object(s), receive an indication of object selection from the set of visual objects. The authentication system 210 may receive the indication of the object selection from the set of visual objects on the first user device 120. In examples based on the type of visual object (e.g., the type of the image such as, but not limited to, trees, animals, etc.), the authentication system 210 may receive an indication of object selection such as a palm tree, cow, etc. In the text phrase embodiment, the authentication system 210 may receive an indication of object selection that corresponds to a selection of a text phrase on the first user device.

In some embodiments, the authentication system 210 may determine that the indication of object selection is associated with a visual selection match (e.g., the correct or otherwise appropriate visual match) among the set of visual objects including a text phrase, the one or more out of band visual objects may be associated with the out of band shared secret delivery channel which correspond to an event over time. One or more visual objects (e.g., the text phrase displayed by the first user device 120) may be the visual selection match that describes the one or more out of band visual object(s) (e.g., displayed by the secondary user device 130) sent via a multimedia message corresponding to the set of visual objects associated with the out of band shared secret delivery channel.

The authentication system 210 may, based on the visual selection match, authenticate access to an application associated with the authentication system and the first user device. In this regard, the authentication system 210 may provide or otherwise permit access to the application and/or content associated with the application.

Figure 3:
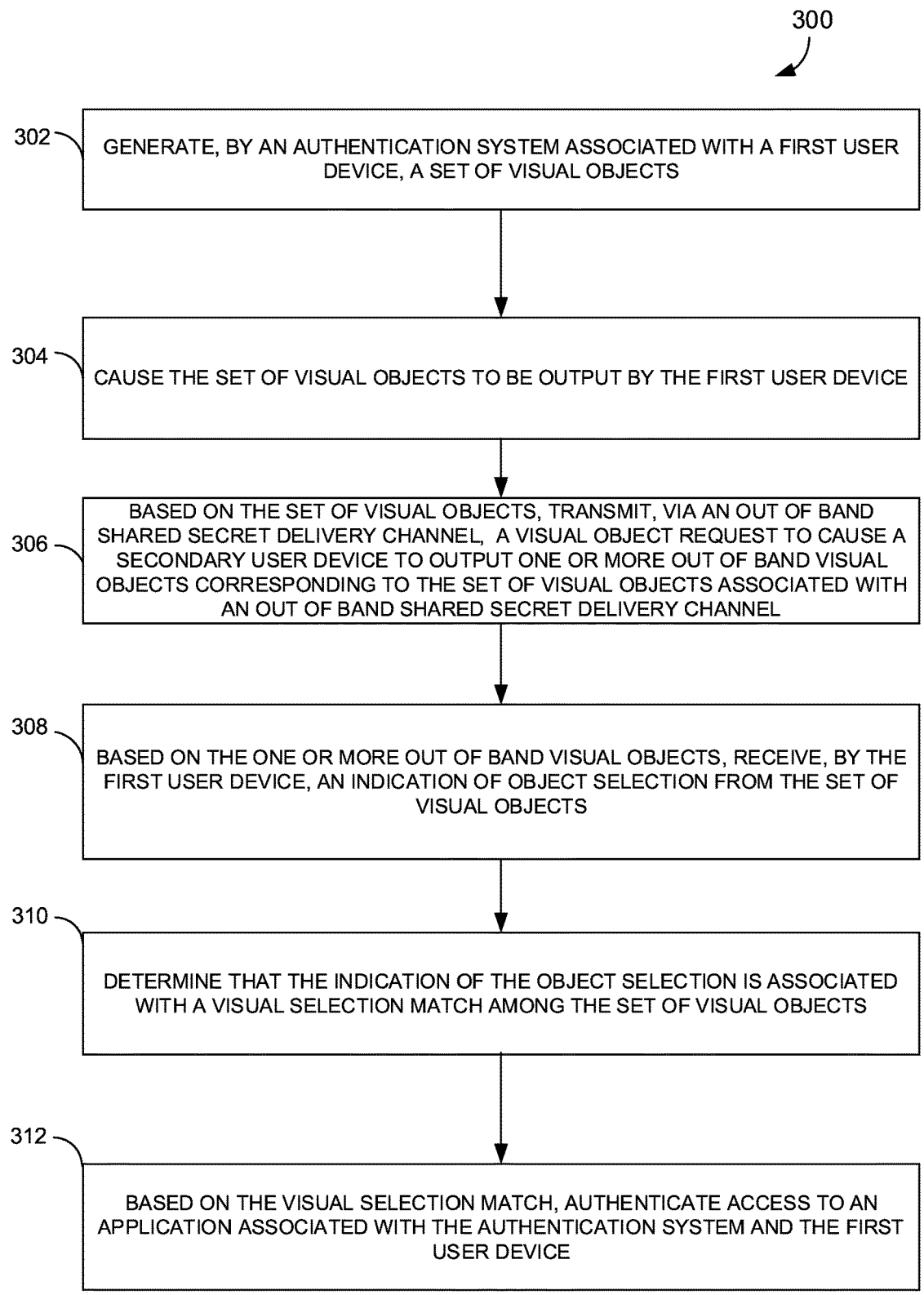
FIG. 3 depicts a flowchart of an exemplary method for providing multi-factor authentication based on visual objects associated with an out of band shared secret delivery channel and at least one user device of a telecommunications network in accordance with an example embodiment.

FIG. 3 depicts a flow diagram of an exemplary method 300 for providing multi-factor authentication based on visual objects associated with an out of band shared secret delivery channel and at least one user device of a telecommunication network, in accordance with implementations of the present disclosure. Initially at block 302 the authentication system generates, via a first user device, a set of visual objects (e.g., a text phrase and/or a set of images).

At block 304, the set of visual objects are caused to be output by the first user device. The authentication system associated with the first user device may cause the set of visual objects to be output (e.g., displayed). In some examples, the output may include a display of a set of images, one or more text phrases, and/or a set of visual objects that correspond to an event over time. The authentication system may randomly choose the output for each authentication transaction to reduce predictability.

In some embodiments, a visual object request is transmitted based on the set of visual objects at block 306. The visual object request may be transmitted to cause a secondary user device to output one or more out of band visual objects corresponding to the set of visual objects associated with an out of band shared secret delivery channel. The visual objects may be transmitted via MMS.

At block 308, an indication of object selection from the set of visual objects is received by the first user device based on the one or more out of band visual objects. The authentication system may receive the indication of the object selection from the set of visual objects on the first user device. The indication of object selection may be based on a selection of the type of visual object (e.g., the type of the image such as animals), a text phrase, and/or a visual object received by the first user device.

At block 310, whether the indication of the object selection is associated with a visual selection match among the set of visual objects is determined. Access to an application associated with the authentication system and the first user device is authenticated based on the visual selection match at 412. Accordingly, the authentication system may permit access to the application and/or content associated with the application.

Figure 4:
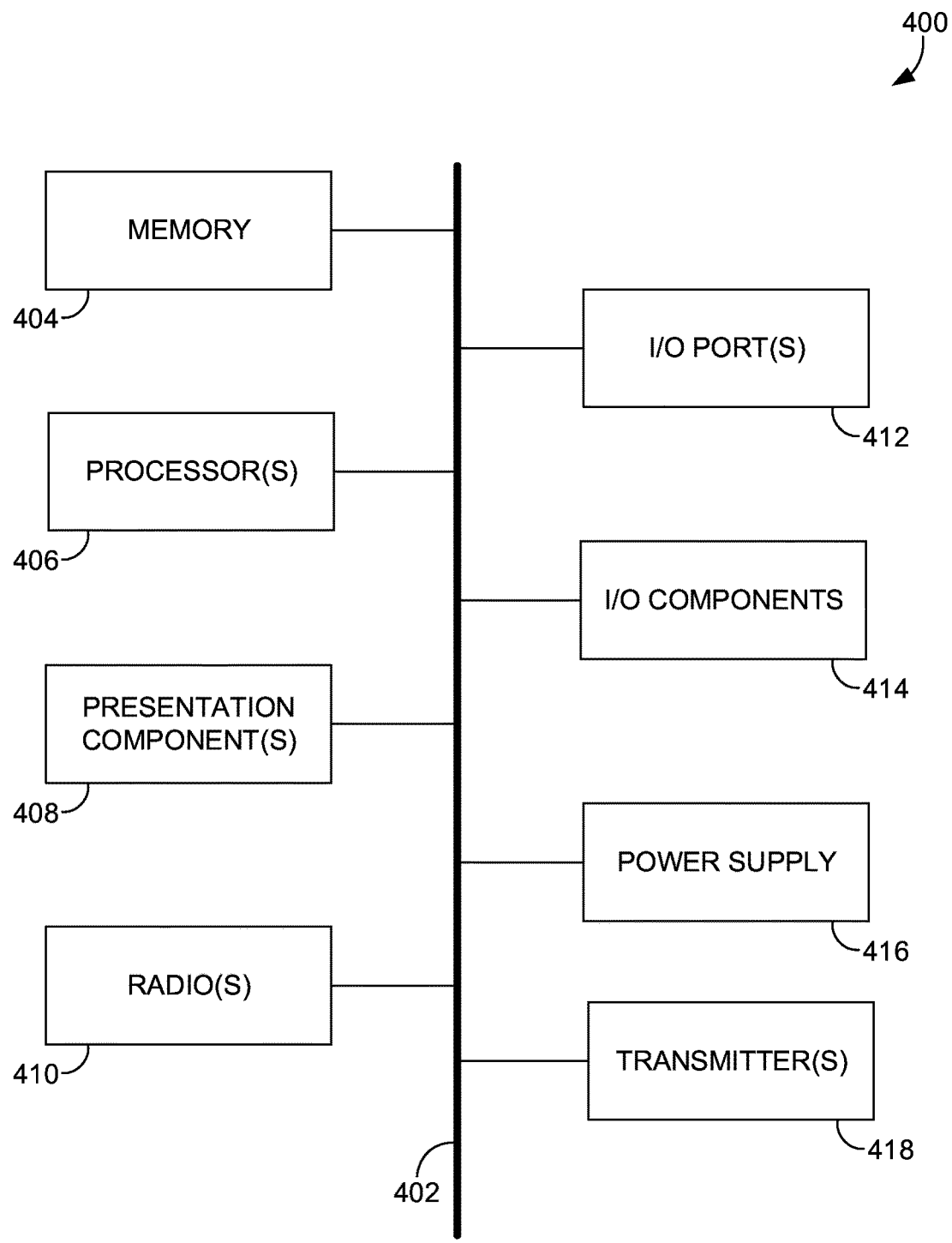
FIG. 4 depicts an exemplary computing device suitable for use in implementations of aspects herein.

Referring to FIG. 4, a block diagram of an example of a computing device 400 suitable for use in implementations of the technology described herein is provided. In particular, the exemplary computer environment is shown and designated generally as computing device 400. Computing device 400 is but one example of a suitable computing environment and is not intended to suggest any limitation as to the scope of use or functionality of the invention. Neither should computing device 400 be interpreted as having any dependency or requirement relating to any one or combination of components illustrated. In aspects, the computing device 400 may be a base station. In another embodiment, the computing device 400 may be UE capable of two-way wireless communications with an access point. Some non-limiting examples of the computing device 400 include a base station, a controller at a base station, a backhaul server, a personal computer, a cell phone, current UE, legacy UE, a tablet, a pager, a personal electronic device, a wearable electronic device, an activity tracker, a laptop, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

As shown in FIG. 4, computing device 400 includes a bus 402 that directly or indirectly couples various components together. The bus 402 may directly or indirectly one or more of memory 404, processor(s) 406, presentation component(s) 408 (if applicable), radio(s) 410, input/output (I/O) port(s) 412, input/output (I/O) component(s) 414, power supply 416, and/or transmitter(s) 418. Although the components of FIG. 4 are shown with lines for the sake of clarity, in reality, delineating various components is not so clear, and metaphorically, the lines would more accurately be grey and fuzzy. For example, one may consider a presentation component(s) 408 such as a display device to be one of I/O components 414. Also, the processor(s) 406 may include memory 404, in another example. The present disclosure hereof recognizes that such is the nature of the art, and reiterates that FIG. 4 is merely illustrative of an example of a computing device 400 that may be used in connection with one or more implementations of the present disclosure. Distinction is not made between such categories as "workstation," "server," "laptop," "handheld device," etc., as all are contemplated within the scope of the present disclosure and refer to "computer" or "computing device."

Memory 404 may take the form of memory components described herein. Thus, further elaboration will not be provided here, but it should be noted that memory 404 may include any type of tangible medium that is capable of storing information, such as a database or data store. A database or data store may be any collection of records, files, or information encoded as electronic data and stored in memory 404, for example. In one embodiment, memory 404 may include a set of embodied computer-readable and executable instructions that, when executed, facilitate various functions or elements disclosed herein. These embodied instructions will variously be referred to as "instructions" or an "application" for short.

Processor(s) 406 may be multiple processors that receive instructions and process them accordingly. Presentation component(s) 408, if available, may include a display device, an audio device such as a speaker, and/or other components that may present information through visual (e.g., a display, a screen, a lamp (LED), a graphical user interface (GUI), and/or even lighted keyboards), auditory, and/or other tactile or sensory cues.

Radio(s) 410 represents one or more radios that facilitate communication with a wireless telecommunication network.

For example, radio(s) 410 may be connected to one or more antenna elements through a physical path. Illustrative wireless telecommunications technologies include CDMA, GPRS, TDMA, GSM, and the like. Radio(s) 410 might additionally or alternatively facilitate other types of wireless communications including Wi-Fi, WiMAX, 3G, 4G, LTE, mMIMO, 5G, 6G, NR, VoLTE, and/or other VoIP communications. As can be appreciated, in various embodiments, radio(s) 410 may be configured to concurrently support multiple technologies, as previously discussed herein. As such, each of many radio(s) 410 may be used to separately control portions of an antenna array, for example, where at least one portion utilizes a distinct technology relative to another portion in the same antenna array or at the same base station or cell site. A wireless telecommunication network might include an array of devices, which are not shown so as to not obscure more relevant aspects of the invention. Components such as a base station, a communications tower, or even access points (as well as other components) can provide wireless connectivity in some embodiments.

The input/output (I/O) ports 412 may take a variety of forms. Exemplary I/O ports 412 may include a USB jack, a stereo jack, an infrared port, a firewire port, other proprietary communications ports, and the like. Input/output (I/O) components 414 may comprise keyboards, microphones, speakers, touchscreens, and/or any other item usable to directly or indirectly input data into the computing device 400.

Power supply 416 may include batteries, fuel cells, and/or any other component that may act as a power source to supply power to the computing device 400 or to other network components, including through one or more electrical connections or couplings. Power supply 416 may be configured to selectively supply power to different components independently and/or concurrently.

Finally, regarding FIGS. 1 through 4, it will be understood by those of ordinary skill in the art that the environment(s), system(s), and/or methods(s) depicted are not intended to limit the scope of use or functionality of the present embodiments. Similarly, the environment(s), system(s), and/or methods(s) should not be interpreted as imputing any dependency and/or any requirements with regard to each component, each step, and combination(s) of components or step(s) illustrated therein. It will be appreciated by those having ordinary skill in the art that the connections illustrated the figures are contemplated to potentially include methods, hardware, software, and/or other devices for establishing a communications link between the components, devices, systems, and/or entities, as may be utilized in implementation of the present embodiments. As such, the absence of component(s) and/or steps(s) from the figures should be not be interpreted as limiting the present embodiments to exclude additional component(s) and/or combination(s) of components. Moreover, though devices and components in the figures may be represented as singular devices and/or components, it will be appreciated that some embodiments can include a plurality of devices and/or components such that the figures should not be considered as limiting the number of devices and/or components.

It is noted that aspects of the present invention are described herein with reference to block diagrams and flowchart illustrations. However, it should be understood that each block of the block diagrams and/or flowchart illustrations may be implemented in the form of a computer program product, an entirely hardware embodiment, a combination of hardware and computer program products, and/or apparatus, systems, computing devices/entities, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Additionally, as should be appreciated, various embodiments of the present disclosure described herein can also be implemented as methods, apparatus, systems, computing devices/entities, computing entities, and/or the like. As such, embodiments of the present disclosure can take the form of an apparatus, system, computing device, computing entity, and/or the like executing instructions stored on a computer-readable storage medium to perform certain steps or operations. However, embodiments of the present disclosure can also take the form of an entirely hardware embodiment performing certain steps or operations.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned may be completed without departing from the scope of the claims below. Certain features and sub-combinations are of utility and may be employed without reference to other features and sub-combinations and are contemplated within the scope of the claims.

The invention claimed is:

1. A system for providing multi-factor authentication based on visual objects associated with an out of band shared secret delivery channel and at least one user device of a telecommunication network, the system comprising:
   an access point communicating with an authentication system, a first user device, and a second user device;
   the authentication system that is structured to:
   generate a set of visual objects;
   cause the set of visual objects to be output by the first user device;
   based on the set of visual objects, transmit, via an out of band shared secret delivery channel, a visual object request to cause the second user device to output one or more out of band visual objects corresponding to the set of visual objects associated with an out of band shared secret delivery channel;
   based on the one or more out of band visual objects, receive, by the first user device, an indication of object selection from the set of visual objects;
   determine that the indication of the object selection is associated with a visual selection match among the set of visual objects; and
   based on the visual selection match, authenticate access to an application associated with the authentication system and the first user device.

2. The system of claim 1, wherein the set of visual objects comprise at least one of a text phrase or a set of images.

3. The system of claim 2, wherein the text phrase comprises at least one multiple choice question.

4. The system of claim 1, wherein the one or more out of band visual objects comprises one or more images associated with a change of at least one of a resolution, rotation, background color, or distortion.

5. The system of claim 1, wherein the one or more out of band visual objects are associated with an out of band shared secret delivery channel.

6. The system of claim 1, wherein the one or more out of band visual objects comprise a type of visual object.

7. The system of claim 1, wherein the one or more out of band visual objects correspond to an event over time, and wherein the event over time corresponds to at least one of one or more next events or a text phrase.

8. The system of claim 1, wherein a multimedia message (MMS) comprises the one or more out of band visual objects.

9. A method for providing multi-factor authentication based on visual objects associated with an out of band shared secret delivery channel and at least one user device of a telecommunication network, the method comprising:
   generating, by an authentication system associated with a first user device, a set of visual objects;
   causing the set of visual objects to be output by the first user device;
   based on the set of visual objects, transmitting, via an out of band shared secret delivery channel, a visual object request to cause a secondary user device to output one or more out of band visual objects corresponding to the set of visual objects associated with an out of band shared secret delivery channel;
   based on the one or more out of band visual objects, receiving, by the first user device, an indication of object selection from the set of visual objects;
   determining that the indication of the object selection is associated with a visual selection match among the set of visual objects; and
   based on the visual selection match, authenticating access to an application associated with the authentication system and the first user device.

10. The method of claim 9, wherein the set of visual objects comprise at least one of a text phrase or a set of images.

11. The method of claim 10, wherein the text phrase comprises at least one multiple choice question.

12. The method of claim 9, wherein the one or more out of band visual objects comprises one or more images associated with a change of at least one of a resolution, rotation, background color, or distortion.

13. The method of claim 9, wherein the one or more out of band visual objects comprise a type of visual object.

14. The method of claim 9, wherein the one or more out of band visual objects correspond to an event over time, and wherein the event over time corresponds to at least one of one or more next events or a text phrase.

15. The method of claim 9, wherein a multimedia message (MMS) comprises the one or more out of band visual objects.

16. Computer storage media having computer-executable instructions embodied thereon that, when executed by one or more processors, cause the processors to:
   generate, by an authentication system associated with a first user device, a set of visual objects;
   cause the set of visual objects to be output by the first user device;
   based on the set of visual objects, transmit, via an out of band shared secret delivery channel, a visual object request to cause a secondary user device to output one or more out of band visual objects corresponding to the set of visual objects associated with an out of band shared secret delivery channel, the one or more out of band visual objects comprising a string;
   based on the one or more out of band visual objects, receive, by the first user device, an indication of object selection from the set of visual objects;
   determine that the indication of the object selection is associated with a visual selection match among the set of visual objects; and
   based on the visual selection match, authenticate access to an application associated with the authentication system and the first user device.

17. The computer storage media of claim 16, wherein the string comprises a sequence of one or more alphanumeric characters or tokens.

18. The computer storage media of claim 16, wherein the set of visual objects comprise at least one of a text phrase or a set of images.

19. The computer storage media of claim 16, wherein the one or more out of band visual objects comprises one or more images associated with a change of at least one of a resolution, rotation, background color, or distortion.

20. The computer storage media of claim 16, wherein the one or more out of band visual objects correspond to an event over time and wherein the event over time corresponds to at least one of one or more next events or a text phrase.

* * * * *